United States Patent [19]

Blum

[11] Patent Number: 5,358,672
[45] Date of Patent: Oct. 25, 1994

[54] METHOD FOR REMOVING FINISHED ARTICLES FROM GLASS, PLASTIC OR METALLIC MOLDS

[75] Inventor: Ronald D. Blum, Roanoke, Va.

[73] Assignee: InnoTech, Inc., Roanoke, Va.

[21] Appl. No.: 895,072

[22] Filed: Jun. 8, 1992

[51] Int. Cl.⁵ .............................................. B29C 39/36
[52] U.S. Cl. ...................... 264/1.38; 264/1.8; 264/2.3; 264/2.5; 264/334; 425/808
[58] Field of Search ............... 264/2.3, 2.2, 1.7, 1.4, 264/2.5, 334, 1.8; 425/808

[56] References Cited

U.S. PATENT DOCUMENTS

| | | | |
|---|---|---|---|
| 3,211,811 | 10/1965 | Lanman | 425/808 |
| 3,902,693 | 9/1975 | Crandon et al. | 425/808 |
| 3,970,362 | 7/1976 | Laliberte | 425/808 |
| 4,166,088 | 8/1979 | Neefe | 264/1.4 |
| 4,623,496 | 11/1986 | Verhoeven et al. | 264/1.7 |
| 4,847,020 | 7/1989 | Akhavi | 264/2.2 |
| 4,879,318 | 11/1989 | Lipscomb et al. | 522/42 |
| 5,114,455 | 5/1992 | Hirota et al. | 264/2.3 |
| 5,147,585 | 9/1992 | Blum | 264/2.2 |
| 5,178,801 | 1/1993 | Shimizu et al. | 264/2.2 |

FOREIGN PATENT DOCUMENTS

| | | | |
|---|---|---|---|
| 56-135030 | 10/1981 | Japan | 264/2.2 |
| 61-261011 | 11/1986 | Japan | 264/2.5 |
| 1-257016 | 10/1989 | Japan | 264/2.5 |

*Primary Examiner*—Jeffery Thurlow
*Attorney, Agent, or Firm*—Kenyon & Kenyon

[57] ABSTRACT

A method for demolding a molded article from a mold assembly having at least one mold with a molding surface includes the steps of: providing at least one tape segment on the molding surface of the mold before performing the molding process such that the tape segment has a portion extending beyond an edge of the molding surface; and, removing the tape segment after performing the molding process by pulling on the extended portion of the tape segment to demold the molded article.

30 Claims, 1 Drawing Sheet

METHOD FOR REMOVING FINISHED ARTICLES FROM GLASS, PLASTIC OR METALLIC MOLDS

BACKGROUND OF THE INVENTION

The cast molding process offers a low cost method for manufacturing components having a high dimensional figure of merit and excellent surface finish. For this reason, the cast molding process is the process of choice when manufacturing optics. Both whole lenses and individual surfaces may be cast molded. Generally, it is advantageous to mold surfaces that have to be replicated many times, while it is more cost effective to use machining techniques to produce surface geometries which are unique to a particular application, e.g., geometries required by an individual ophthalmic prescription. For this reason, whole ophthalmic lenses as well as semi-finished ophthalmic blanks have been manufactured by cast molding processes over the last thirty years.

In cast molding ophthalmic optics, the resin is selected so that it has good adhesion to the mold surface in the uncured or semicured state. This requirement ensures that the mold is pulled inward as the resin undergoes shrinkage during the curing process. If a gasket is used to secure a pair of molds to form the cavity enclosing the resin, the compressive force exerted by the molds in contact with the resin under cure causes deformation and shrinkage of the gasket. If a gasket-free molding process is used to cast mold the optic, such as described in U.S. Pat. No. 4,623,496, issued to J. Verhoeven, and in U.S. Pat. No. 5,178,800, the mold moves in response to shrinkage of the resin, and develops the final optical geometry (resin thickness from point to point). Lacking good adhesion to the mold or molds, the resin pulls away from the mold surface during the molding process, causing a defect to form at that particular point. Therefore, good adhesion between the mold and the resin is a prerequisite for successfully molding high fidelity optics. Unfortunately, good adhesion between the mold or molds and the resin also makes it difficult to demold the optic at the end of the cure process. Too strong an adhesion between the mold and the resin causes the mold or the optic to crack, or the mold to suffer "pull out" during the demolding process.

To balance these competing factors, it has been necessary to develop an optimum level of adhesion between the resin and the mold surface. Mold release agents may be added to the formulation to reduce adhesion between the cured resin surface and the mold without significantly reducing the adhesion in the precured or semicured state. Even then, demolding the optic upon completion of the cure cycle requires that a considerable force or mechanical impact be applied, thus shortening mold life. In certain instances, air hammers, mechanical wedges, and conventional hammers have been employed to open molds.

It would, therefore, be desirable to provide a method for demolding optics which eliminates or minimizes the mechanical force which is otherwise required to separate the mold from the optic.

SUMMARY OF THE INVENTION

The present invention relates to a method for demolding a molded article from a mold assembly having at least one mold with a molding surface. According to the invention, demolding can be simplified by forming a notch in the resin layer immediately adjacent to the mold so that the mold surface is free from the resin layer at the location of the notch when the mold assembly is removed from the curing chamber so that it is still hot. The notch acts as a nucleus for the rapid release of the mold and from the optic. Accordingly, demolding of the mold does not require any kind of further handling or treatment.

If the molding process is carried out at or near room temperature (e.g., such as disclosed by Lipscomb in U.S. Pat. No. 4,879,318), the mold assembly may have to be cooled in ice water after forming the notch.

A preferred method of forming the notch involves placing a thin piece of tape at the edge of the optic so that the tape adheres to the surface of the mold and protrudes a short distance into the mold assembly. During the cure process, the tape prevents full contact between the resin and the mold at the location of the tape and it also prevents full cure of the resin at the same location. After the cure process, the tape may be pulled out of the mold assembly, immediately forming the notch discussed above. The mold assembly may then be simply left in air to cool to room temperature so that it spontaneously opens without further assistance. The time required to complete the opening process depends on the design and size of the mold assembly, but is typically complete within about 2 minutes.

DETAILED DESCRIPTION OF THE INVENTION

Figure 1:
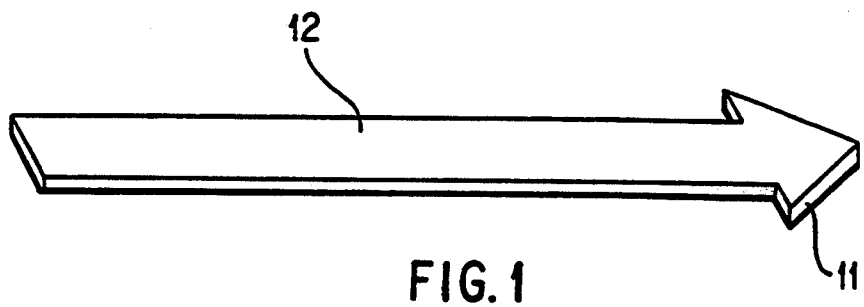
FIG. 1 is a perspective view of the tape used in connection with the method for demolding a molded article of the present invention.

As seen in FIG. 1, the head 11 of the tape is to be adhesively bonded to the concave surface of the mold 21, while the distal portion 12 of the tape is left free. A preferred embodiment utilizes an adhesive tape which is 1.5 in × 0.25 in dimension, and 0.04 mm thick. The head 11 of the tape is shaped in the form of a triangle, which in one embodiment has a length of 7 mm on each side. A portion of the tape 30 mm in length may be left outside the mold assembly so that the free end of the tape may be easily grasped.

Figure 2A:
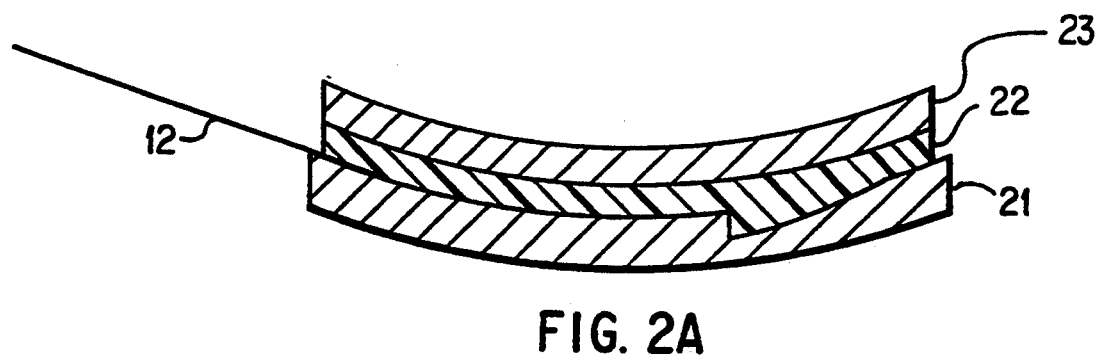
FIG. 2A shows a mold assembly used in a gasket free casting process (i.e., surface casting) that includes a mold, a tape adhesively bonded to the mold, an optical preform, and a resin filling the cavity between the mold and the preform.
Figure 2B:
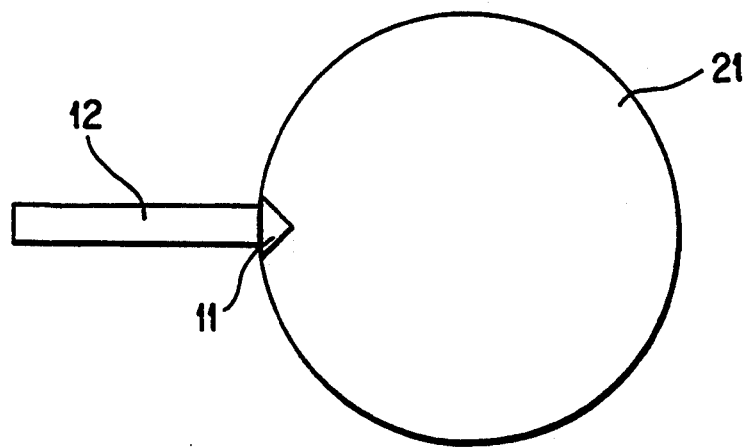
FIG. 2B shows the tape bonded to the mold of FIG. 2A.

A typical mold assembly is shown in FIG. 2A. The mold assembly includes a mold 21, a tape 12 adhesively bonded to the mold 21, an optical preform 23, and a resin 22 filling the cavity between the mold 21 and the preform 23.

In a preferred embodiment, the tape may have one surface covered with an adhesive that can bond to the surface of the mold, which may be made of a hard plastic, crown glass or a metallic material, i.e., coated with Nickel or chrome. The tape may be made of uncoated or coated plastic, such as polyvinylidene chloride (Saran), polyethylene, polyvinyl acetate, nylon, poly (difluoroethylene), tradename Tedlar (DuPont), a copolymer of acrylic or methacrylic esters, aromatic polyesters, polyurethanes, cellulose and derivatives thereof, or other similar film forming polymers, either by themselves or with a metallic coating such as aluminum, chromium, copper, gold, silver or any other metal.

In a second preferred embodiment, the tape may be used to cast ophthalmic optics without a gasket, such as in surface casting optics in which the resin is placed between a mold and a optical preform. The curing process may involve application of heat, ultraviolet radiation, or a combination of the two. When used in the surface casting process, the tape is adhesively bonded to the edge of the mold or the preform, so that the head 11 projects 5 mm inward, while the distal portion 12 projects outward up to a length of 2 inches. A predetermined volume of resin is then dispensed into the mold, and the preform is carefully floated and rotated into position. The distance power and cylinder of the final prescription are incorporated into the optical preform, which may be cast molded into its final shape and geometry, injection molded or machined from a blank. The surface of the preform is pretreated to ensure maximum bonding with the cure resin layer.

The mold may be spherical or aspheric in geometry, and may incorporate an add power for near vision, either in a segment, or over a zone as in the form of a progressive addition optic design.

The resin may be formulated to include a photoinitiator or a thermal initiator or a combination thereof, so that the cure can be accomplished through the application of heat or ultraviolet radiation or a photothermal ramping cycle in which the temperature of the mold assembly is held within certain specified limits during a cure process involving application of ultraviolet radiation.

One surface of the tape may have an adhesive coating, so that the tape can be readily bonded to the concave surface of the mold at one edge. Alternatively, the tape may be adhesively bonded to the edge of the preform. Optical preforms fitted with tapes may be supplied to users of surface casting technology. The tape material is chosen to be largely unaffected by the resin at the curing conditions, i.e., the temperature, and the wavelength and intensity of the irradiation, so that no significant chemical degradation or shrinkage occurs during cure. The thickness of the tape should not exceed the thickness of the cured resin layer at the optic zone providing distance correction only. Preferably, the thickness of the tape should not exceed 0.05 mm, and should not be less than 0.02 mm. Tape of lesser thickness may not have sufficient strength to cause the formation of a notch when it is peeled off. Tapes having a thickness greater than that specified may cause the formation of prism in the optic in flattop optics. The maximum allowable thickness of tapes is greater when casting progressive addition optics, but should not exceed 1.0 mm.

Preferably, the temperature of the mold assembly seen in FIG. 2A at the completion of the cure process is between 130°–190° F. The cure is completed in a period of 5–60 minutes. The mold assembly is withdrawn from the curing chamber after the cure process is completed, and the tape is pulled out from the mold-resin juncture by pulling on the tape in a sudden or abrupt manner. The removal of the tape creates a notch. The mold assembly is subsequently cooled by blowing air having a temperature equal to or less than room temperature over that part of the edge containing the notch, as well as over the mold surface. A demolded area is formed immediately, and it grows to cover the entire area of the mold surface over a period of 1–5 minutes.

In a third preferred embodiment, the tape is applied to both the upper and lower molds, which is used in connection with a cast molding process in which a whole lens is molded according to the method disclosed by Lipscomb in U.S. Pat. No. 4,879,318. The two tapes may be oriented to oppose each other so as to avoid a shadowing effect, which may occur when the ultraviolet radiation is blocked by the metallic tapes. Although one tape may block access to the radiation from the side of the mold on which it is disposed, access to the radiation is maintained from the other side if the tapes are applied in an opposing fashion (i.e., approximately 180 degrees apart). As a consequence of this opposing relation between the two tapes, the rate of cure at the edge is unaffected. As disclosed by Lipscomb, the temperature of the mold assembly is less than 140 F. when it is withdrawn from the curing chamber. The tape segments are peeled off as described above and the mold assembly is subsequently cooled with a stream of air at or below room temperature directed at the mold resin junctures where notches have been created by the removal of the tape segments.

Alternatively, the tape segment may comprise two or more flexible members formed in the inner side of the gasket. As the molds are fit into the gasket to form the molding cavity, the flexible members intrude into the cavity to contact the molding surfaces of the molds. The cavity is then filled with the resin, and the molding process is performed as before. Demolding is accomplished by removing the gasket.

In a fourth preferred embodiment, the tape is applied to both upper and lower molds of a mold assembly that incorporates a resin formulated with a thermal initiator. The mold assembly includes an upper mold having the surface geometry of the optic needed for common spherical and cylinder prescriptions and a lower mold having a flat surface to yield a semifinished blank. In this case, the tape material is chosen so that it does not soften or shrink at the maximum postcuring temperature that might be employed, which is generally less than 250 F. A crosslinked acrylic, polyester, or a polyvinylidene chloride or poly(difluoro ethylene) based material is preferred. Metallic tape may also be used with this embodiment of the invention.

The method of the present invention, which provides a mold assembly allowing demolding with minimal damage to the mold and the optic, may be applied to other molding processes that will be apparent to those skilled in the art. For example, the method of the present invention is readily applicable to any mold assembly in which a mold (permanent or disposable, transparent or reflective) is used to form a surface having a high figure of merit or dimensional control.

What is claimed is:

1. A method for demolding a molded article from a mold assembly having at least one mold with a molding surface, said method comprising the steps of:

providing at least one tape segment on the molding surface of the mold before performing a molding process, said tape segment having an extended portion extending beyond an edge of the molding surface;

performing said molding process; and demolding the molded article after performing the molding process by pulling on said extended portion of said tape segment; and removing the tape segment from the molded article.

2. The demolding method of claim 1 wherein said mold assembly comprises two molds each having a molding surface, a flexible gasket, a polymerizable resin formulation, and at least one tape segment contacting the resin and adhesively bonded to the molding surface of at least one of said molds.

3. The demolding method of claim 1, wherein the mold assembly comprises a mold having a surface geometry corresponding to an ophthalmic optic, a resin, an optical preform, and at least one tape segment adhesively bonded to a concave surface of said mold;

said mold providing add power in the range of +1.00D to +4.00D, either in a bifocal, multifocal segment or progressive addition optic design;

said optical preform providing spherical power in the range +6.00D to −6.00D, and cylinder power in the range −1.00D to −3.00D;

said resin including an initiator; and said tape segment extending between approximately 1 mm and 8 mm inward from the edge of said mold, and between approximately 0.5 cm 8.0 cm outward from the edge of said mold when positioned on said mold.

4. The demolding method of claim 2, wherein the mold assembly comprises a mold having a Surface geometry corresponding to an ophthalmic optic, a resin, an optical preform, and at least one tape segment adhesively bonded to a concave surface of said mold;

said mold providing add power in the range of +1.00D to +4.00D, either in a bifocal, multifocal segment or progressive addition optic design;

said optical preform providing spherical power in the range +6.00D to −6.00D, and cylinder power in the range −1.00D to −3.00D;

said resin including an initiator; and said tape segment extending between approximately 1 mm and 8 mm inward from the edge of said mold, and between approximately 0.5 cm 8.0 cm outward from the edge of said mold when positioned on said mold.

5. The demolding method of claim 3 wherein said mold has a spherical geometry.

6. The demolding method of claim 3 wherein said mold has an aspheric geometry.

7. The demolding method of claim 3 wherein said optical preform has a spherical geometry.

8. The demolding method of claim 3 wherein said optical preform has an aspheric geometry.

9. The demolding method of claim 3 wherein said initiator comprises a thermal initiator.

10. The demolding method of claim 3 wherein said initiator comprises an ultraviolet initiator.

11. The demolding method of claim 3 wherein said initiator comprises a thermal and an ultraviolet initiator.

12. The demolding method of claim 3 wherein said tape is substantially transparent.

13. The demolding method of claim 3 wherein said tape is substantially opaque.

14. The demolding method of claim 1, wherein the mold assembly comprises a mold having a surface geometry corresponding to an ophthalmic optic, a resin, an optical preform, and at least one tape segment adhesively bonded to a convex surface of the preform;

said mold providing add power in the range of +1.00D to +4.00D, either in a bifocal, multifocal segment or a progressive addition optic design;

said optical preform providing spherical correction in the range of +6.00D to −6.00D, and cylinder power in the range −1.00D to −3.00D;

said resin being formulated to incorporate an initiator;

said tape segment extending between approximately 1 mm and 8 mm inward from the edge of said optical preform, and between approximately 0.5 cm and 8.0 cm outward from the edge of said preform when positioned on said preform.

15. The demolding method of claim 14 wherein said mold has a spherical geometry.

16. The demolding method of claim 14 wherein said mold has an aspheric geometry.

17. The demolding method of claim 14 wherein said optical preform has a spherical geometry.

18. The demolding method of claim 14 wherein said optical preform has an aspheric geometry.

19. The demolding method of claim 14 wherein said initiator comprises a polymerization thermal initiator.

20. The demolding method of claim 14 wherein said initiator comprises an ultraviolet polymerization initiator.

21. The demolding method of claim 14 wherein said initiator comprises a thermal polymerization initiator and an ultraviolet polymerization initiator.

22. The demolding method of claim 14 wherein said tape segment is substantially transparent.

23. The demolding method of claim 14 wherein said tape segment is substantially opaque.

24. The demolding method of claim 1 wherein the tape segment comprises a thin plastic film having a softening temperature greater than 45 C. and a thickness approximately between 0.02 mm and 1.0 mm, said tape segment being formed from a plastic material capable of withstanding temperature and irradiation conditions required for a curing process associated with said molding process without significant chemical degradation or shrinkage.

25. The demolding method of claim 24 wherein said tape segment has a metallized layer.

26. The demolding method of claim 24 wherein said tape segment is substantially transparent.

27. The demolding method of claim 24 wherein said tape segment is substantially opaque.

28. The demolding method of claim 24 wherein said tape segment comprises a material selected from the group consisting of a polyester, an acrylic, a polyamide, a polyimide, a polyolefin and a fluorinated polyolefin.

29. The demolding method of claim 24 wherein said tape segment has an adhesive coating on at least one side.

30. A method for molding an ophthalmic optic comprising the steps of:

providing a mold having a mold cavity with a molding surface;

providing at least one tape segment on said molding surface, said tape segment having an extended portion extending beyond an edge of said molding surface;

providing a predetermined volume of resin in said mold cavity;

positioning an optical preform on the surface of said resin in said mold cavity;

curing said resin;

demolding said ophthalmic lens by pulling on said extended portion of said tape segment; and removing the tape segment from the ophthalmic lens.

* * * * *